US009816800B2

(12) United States Patent
O'Brien et al.

(10) Patent No.: US 9,816,800 B2
(45) Date of Patent: Nov. 14, 2017

(54) METHOD OF FABRICATION OF LAMINATES OF ELASTIC MATERIAL SUITABLE FOR DIELECTRIC ELASTOMER SENSING

(71) Applicant: StretchSense Limited, Auckland (NZ)

(72) Inventors: Benjamin Marc O'Brien, Auckland (NZ); Todd Alan Gisby, Auckland (NZ); Antoni Edward Harbuz, Auckland (NZ); Samuel Schlatter, Auckland (NZ)

(73) Assignee: Stretchsense Limited, Penrose, Auckland (NZ)

( * ) Notice: Subject to any disclaimer, the term of this patent is extended or adjusted under 35 U.S.C. 154(b) by 0 days.

(21) Appl. No.: 15/028,338

(22) PCT Filed: Oct. 10, 2014

(86) PCT No.: PCT/NZ2014/000216
§ 371 (c)(1),
(2) Date: Apr. 8, 2016

(87) PCT Pub. No.: WO2015/053638
PCT Pub. Date: Apr. 16, 2015

(65) Prior Publication Data
US 2016/0238368 A1 Aug. 18, 2016

(30) Foreign Application Priority Data
Oct. 10, 2013 (NZ) .................................. 616529

(51) Int. Cl.
*G01L 1/00* (2006.01)
*G01B 7/16* (2006.01)
(Continued)

(52) U.S. Cl.
CPC ........... *G01B 7/18* (2013.01); *A61N 1/36014* (2013.01); *B32B 7/045* (2013.01); *B32B 7/06* (2013.01);
(Continued)

(58) Field of Classification Search
CPC .. G01B 7/18; G01B 7/22; B32B 37/10; B32B 38/10; B32B 37/0076; B32B 2307/202;
(Continued)

(56) References Cited

U.S. PATENT DOCUMENTS 5,060,527 A * 10/1991 Burgess .................. G01L 1/205
338/47
8,105,456 B2 * 1/2012 Lin ......................... B32B 27/08
156/235

(Continued)

FOREIGN PATENT DOCUMENTS

KR   10-2012-0114961   10/2012

OTHER PUBLICATIONS

International Search Report for International Application No. PCT/NZ2014/000216, dated Feb. 26, 2015.

*Primary Examiner* — Max Noori
(74) *Attorney, Agent, or Firm* — Sean D. Detweiler, Esq.; Morse, Barnes-Brown & Pendleton, P.C.

(57) ABSTRACT

In one aspect the invention provides a method of fabricating a laminate of flexible and compliant layers of material, such as used to provide a dielectric elastomer sensor. According to the method a flexible and compliant layer of material which is affixed to a substrate to avoid strain during processing is bonded to another layer of flexible and compliant material and released from the substrate to form a laminate. The layer of flexible and compliant material affixed to the substrate may be inspected prior to bonding.

22 Claims, 11 Drawing Sheets

(51) Int. Cl.
  *G01L 1/14* (2006.01)
  *A61N 1/36* (2006.01)
  *G01L 1/20* (2006.01)
  *B32B 7/06* (2006.01)
  *B32B 7/12* (2006.01)
  *B32B 7/04* (2006.01)
  *B32B 37/10* (2006.01)
  *B32B 37/16* (2006.01)
  *B32B 38/10* (2006.01)
  *A61N 1/08* (2006.01)
  *B32B 37/00* (2006.01)
  *B32B 37/12* (2006.01)

(52) U.S. Cl.
  CPC ............ *B32B 7/12* (2013.01); *B32B 37/0076* (2013.01); *B32B 37/025* (2013.01); *B32B 37/10* (2013.01); *B32B 37/16* (2013.01); *B32B 38/10* (2013.01); *G01B 7/22* (2013.01); *G01L 1/14* (2013.01); *G01L 1/142* (2013.01); *G01L 1/20* (2013.01); *A61N 1/08* (2013.01); *B32B 37/003* (2013.01); *B32B 37/12* (2013.01); *B32B 2307/202* (2013.01); *B32B 2307/204* (2013.01); *B32B 2307/51* (2013.01); *B32B 2457/00* (2013.01); *B32B 2535/00* (2013.01)

(58) Field of Classification Search
  CPC . B32B 2307/51; B32B 2535/00; B32B 7/045; B32B 7/06; B32B 7/12; B32B 37/025; B32B 37/16; B32B 37/003; B32B 37/12; A61N 1/36014; A61N 1/08; G01L 1/14; G01L 1/142; G01L 1/20
  USPC .................... 73/849, 862.381, 862.391, 774
  See application file for complete search history.

(56) References Cited

U.S. PATENT DOCUMENTS

| | | | |
|---|---|---|---|
| 8,286,345 B2* | 10/2012 | Dangel | B81C 3/008 29/825 |
| 2006/0154398 A1 | 7/2006 | Qing et al. | |
| 2009/0188108 A1 | 7/2009 | Dangel et al. | |
| 2010/0033196 A1 | 2/2010 | Hayakawa et al. | |
| 2011/0096025 A1* | 4/2011 | Slobodin | G06F 3/044 345/174 |
| 2011/0117810 A1 | 5/2011 | Morley et al. | |
| 2012/0068331 A1* | 3/2012 | Chow | H01L 21/56 257/735 |
| 2013/0104665 A1 | 5/2013 | Biris et al. | |
| 2013/0236730 A1* | 9/2013 | Bose | H01L 41/0815 428/447 |
| 2015/0054527 A1* | 2/2015 | Reese | A61B 5/1071 324/671 |
| 2015/0268106 A1* | 9/2015 | Otaka | G01L 1/146 73/780 |
| 2016/0018275 A1* | 1/2016 | Kaneko | G01B 1/00 73/862.626 |

* cited by examiner

First flexible and compliant layer bonded to second flexible and compliant layer First flexible and compliant layer NOT bonded to second flexible and compliant layer

METHOD OF FABRICATION OF LAMINATES OF ELASTIC MATERIAL SUITABLE FOR DIELECTRIC ELASTOMER SENSING

RELATED APPLICATIONS

This application is a national stage filing under 35 U.S.C. 371 of International Application No. PCT/NZ2014/000216, filed Oct. 10, 2014, which claims priority to New Zealand Application No. 616529, filed Oct. 10, 2013. The entire teachings of the above applications are incorporated herein by reference. International Application PCT/NZ2014/000216 was published under PCT Article 21(2) in English.

FIELD OF THE INVENTION

This invention relates to a method of fabricating a laminate of flexible and compliant material such as a laminate of conductive and dielectric layers operable to provide changing electrical characteristics under deformation, such as in dielectric elastomer sensing.

BACKGROUND OF THE INVENTION

There are many applications where it would be desirable to attach a sensing device to a flexible and compliant structure, such as the human body for example, which is capable of undergoing dynamic and large deformations and strains. This feedback could be used for applications such as measuring strain or deformation for scientific or research purposes, to capture motion for use in movies or animation, or to use the structure as an input to some process, such as a human machine interface for example, just to name a few.

However, if the sensing device itself is relatively hard, inflexible, or non-compliant, or some combination of these, it may have an undesirable influence on the properties of the structure, restrict or alter the natural strain or deformation response of the flexible and compliant structure so it no longer accurately represents its natural strain or deformation response, or make it difficult to correlate the state of the sensing device and the state of the flexible and compliant structure, for example. To overcome this limitation, it is advantageous for the sensing device to be flexible, compliant and lightweight to minimize any impact on the structure being measured.

Flexible and compliant soft polymer thin films have application in unobtrusive sensing devices, to give an example. A sensing device however must typically also incorporate a substantially electrically conductive feature to provide a conductive pathway for electrical signals used in the sensing process. This can be achieved by creating a flexible and compliant film that is substantially electrically conductive by dispersing a sufficient percentage by volume conductive particles such as carbon powder into a polymer matrix such as silicone, for example. Robust sensing elements can be created using a combination of these electrically conductive films and electrically non-conductive films.

Flexible and compliant electrical components such as resistors and capacitors with deformation dependent properties can be made by laminating electrically non-conductive and electrically conductive layers. For example, a Dielectric Elastomer (DE) is a stackable flexible and compliant capacitor consisting of flexible and compliant dielectric that is substantially electrically non-conductive sandwiched between two flexible and compliant electrodes. A DE can be used as a flexible and compliant sensor by using electronic circuits to monitor one or more of properties such as capacitance, the resistance of the electrodes, and the conductivity of the dielectric, which are affected by stimuli such as the DE being stretched, for example.

A challenge with fabricating laminates of materials for sensing devices or for dielectric elastomer devices is that the dispersants used to provide conductivity in one layer of the laminate may contaminate dielectric layers. This contamination may lead to reduced dielectric effect or of the dielectric layers and diminish the operation of the sensors.

Another challenge is in fabricating laminates with layers as thin as possible. Challenges in fabricating laminates for devices with thin films often result in defects such as particulates, air bubbles, or areas of weak bonding. These may compromise the structural integrity of the device by creating a stress riser, a region of inhomogeneous strain, or promoting separation of the layers.

Other challenges lie in compounding the challenges above, such as in mitigating contamination as laminates with progressively thinner layers are fabricated.

It would therefore be of advantage to have a method of fabricating laminates for devices from flexible and compliant films which could address any or all of the above challenges, or at least provide the public with an alternative choice.

It would also be of advantage to have a laminate for a device from flexible and compliant films which could address any or all of the above challenges, or at least provide the public with an alternative choice.

DISCLOSURE OF THE INVENTION

Aspects of the present invention provide a method of fabricating a laminate of first and second layers of elastic or flexible and compliant material wherein the first layer is affixed temporarily to a substrate for bonding to the second layer bonded to the second layer, and released from the substrate after the layers are bonded. This may mitigate strain being introduced into the first layer during handling, bonding and/or processing prior to release from the substrate.

Aspects of the present invention provide a method of fabricating a laminate having first and second layers of elastic material wherein the first and second layers of elastic material are provided on respective substrates which are brought together so the first and second layers form the laminate.

Aspects of the present invention provide a method of fabricating a laminate having first and second layers of elastic material wherein the first and second layers are provided on respective substrates and inspected while on the substrate and prior to being pressed together to form the laminate.

Aspects of the present invention provide a method of fabricating a laminate comprising providing the elastic layer on a substrate which is less flexible than the elastic layer. The substrate may be flexible.

Aspects of the present invention provide a method or fabricating a layer of elastic material for use in fabricating a laminate of elastic material the method comprising forming a layer of material on a substrate suitable for handling or processing the fabricated layer while preventing strain or damage to the layer. The substrate may be sacrificial in the fabrication of the laminate.

Aspects of the present invention provide a method of fabricating a laminate comprising first and second layers of material the method comprising the steps of the first layer being provided on a substrate, bonded to the second layer to form the laminate, and released from the substrate.

One or more of the first or second layers of material may be elastic.

One or more of the first and second layers may be flexible.

One or more of the first and second layers may be compliant.

The step of bonding the first layer to the second layer may comprise pressing the first layer between the substrate and the second layer.

The substrate may be flexible.

The substrate may be less elastic than the first layer.

The first layer may be inelastic relative to the first layer.

The substrate may be less compliant than the first layer.

The flexible layer may be non-compliant relative to the first layer.

The first layer may be temporarily affixed to the substrate so as to allow it to be released by a release treatment. The first layer may be affixed by bonding to the substrate.

The first layer may be affixed to the substrate such that strain perpendicular to the through-thickness of the layer is not imparted to the first layer during handling bonding and/or processing.

The substrate may comprise the sacrificial layer to which the first layer is affixed and which releases the first layer when a release treatment is applied to the sacrificial layer.

The sacrificial layer may coat at least a portion of the substrate.

The substrate may be a sacrificial layer.

The sacrificial layer may be soluble in a release solute in which the first layer is not soluble, whereby the first layer may be released from the substrate by exposure of the sacrificial layer to the solute.

The sacrificial layer may be operable to release the first layer by heating.

The sacrificial layer may be operable to release the first layer by peeling.

The sacrificial layer may be operable to melt to release the first layer.

The first substrate may be formed of a material to which the first layer does not permanently adhere to and release of the first layer may comprise peeling.

The first layer may be fabricated on the first substrate.

Fabrication of the first layer may comprise providing a precursor material for the first layer on the substrate.

Fabrication of the first layer may comprise processing the precursor material into a thin film using a doctor blade.

Fabrication of the first layer may comprise processing a precursor material by spraying.

Fabrication of the first layer may comprise processing a precursor material by spin coating.

Fabrication of the first layer may comprise processing a precursor material by molding.

Fabrication of the first layer may comprise processing a precursor material by printing.

Fabrication of the first layer may comprise processing a precursor material by screen printing.

Fabrication of the first layer may comprise treating the precursor material so as to cause cross-linking.

Fabrication of the first layer may comprise treating the precursor material so as to cause curing.

The first layer and or first substrate may be selected from materials which form a releasable bond between the substrate and the first layer upon fabrication of the first layer and/or cross-linking and/or curing of a precursor material. The bond may be temporary before release.

The method may comprise inspecting the first layer prior to bonding to the second layer. The inspection may comprise collecting data characterising the first layer. The data may characterise strain in the first layer. The strain may characterise defects in the first layer.

The first layer may be pre-fabricated prior to being transferred to the first substrate.

One or more of the first or second layers may comprise conductive material operable to provide the laminate with electrical properties which vary with deformation.

One or more of the first or second layers may be electrically conducting and the other of the first or second layers may be electrically non-conducting so that the laminate provides a deformation sensor. The sensor provided may vary in resistance with deformation. The sensor provided may vary in capacitance with deformation.

The laminate may be a dielectric elastomer device.

The method may comprise additional steps performed on the first layer when affixed to the substrate. The additional steps may be performed prior to bonding the first layer to the second layer.

The method may comprise bonding a third layer to first or second layer to form a laminate with three or more layers.

The first or second layer may comprise a laminate of layers whereby the method fabricates a laminate of four or more layers.

The additional processing may comprise cutting a laminate comprising the first layer and the first substrate into one or more areas to be used in the fabrication of a laminate. The areas used may meet a specification for usability.

The additional processing may comprise cutting a stack comprising the first layer and the first substrate to remove one or more defective areas to not be used in the fabrication of a laminate or to leave only non-defective areas to be used in the fabrication of the laminate. The defective areas used may be identified as areas which do not meet a specification for usability.

The additional processing may comprise cutting a stack comprising the first layer and the first substrate into a defined geometry.

The method may comprise the second layer being formed on a second substrate prior to the first and second layers being bonded to form the laminate.

The method may comprise forming a mask to prevent bonding, the mask formed on one or more of the first or second layers. The mask may define regions in the laminate or a set of laminates in which the first and second layers do not bond.

The method may comprise bonding regions of the first and second layers which are identified as useable and/or non-defective. The method may comprise forming a mask which prevents bonding in defective areas. This may provide a laminate suitable for avoiding errors when used in sensing of deformation.

The method may comprise applying adhesive and/or a bonding material to one or more regions of the first and/or second layer to define regions where the first and second layers are bonded.

The method may comprise applying adhesive to regions identified as useable and/or non-defective on one or more of the first and second layers.

The method may comprise applying bonding treatment to the first and/or second layer in defined regions such that bonding is promoted between the first and second layers bond when brought into contact in a given position after treatment or brought into direct contact after the treatment.

The method may comprise applying external pressure to press the first and second layers together.

The method may comprise using one or more rollers to apply pressure to the first and second layers. The method may comprise passing the layers affixed to the substrates under one or more rollers or between two or more rollers.

The method may comprise applying external pressure using a vacuum bag in which is evacuated while containing the first and second layers to apply pressure externally to the two layers.

The method may comprise applying external pressure using a mass.

The method may comprise applying external pressure using a mechanical press.

The method may comprise applying pressure for one or more defined intervals. The intervals may be selected dependent on data predicting a strength of bond between the first and second layers which increases over time under pressure.

The bonding treatment may be applied to an exposed surface of a defined usable or non-defective region on one or more of the first and second layers.

The bonding treatment may comprise plasma treatment.

The method may comprise bringing regions and or areas of the first and second layers together so that they touch in a desired position. This may be used to touch in useable regions.

The method may comprise the second layer affixed to a second substrate and released from the second substrate subsequent to bonding with the first a layer.

The method may comprise applying a release treatment selectively to the sacrificial layer affixing the first layer of material so as to release the first layer of material from the second substrate and leave the second layer of material affixed to the first substrate.

The method may comprise peeling the first substrate from the first layer of material to leave the first layer bonded to the second layer.

The method may comprise bonding a third layer of material to the laminate.

The third layer of material may be bonded to the first layer after it is released from the first substrate.

The third layer may be bonded to the first layer which forms a laminate with the second layer wherein the second layer is affixed to the second substrate.

The method may comprise releasing the second layer from the second substrate.

The second layer may have properties defined in any one of the paragraphs above.

The second substrate may have properties defined in any one of the paragraphs above.

The method may comprise steps for the second layer and/or second substrate defined in paragraphs above with respect to the first layer and/or first substrate.

The method may comprise affixing by bonding.

One aspect of the present invention provides a laminate fabricated by the method of any one of the paragraphs above.

One aspect of the invention provides an electrical sensor comprising two or more layers of material bonded together over one or more defined bonding regions with the layers being bonded while one or more of the layers was releasably affixed to a substrate.

One or more of the two or more layers may be elastic.
One or more of the two or more layers may be flexible.
One or more of the two or more layers may be compliant.
One or more of the two or more layers may be resilient.

One of the two or more layers may be electrically non-conducting.

One of the two or more layers may be electrically conducting. The electrically conducting layer may have electrical properties that vary with deformation. The electrical property which varies may be conductivity and/or resistance. Two or more layers may collectively have one or more electrical properties which vary with deformation. The electrical property of the two or more layers may be capacitance. The electrical property of the two or more layers may be capacitance and electrical resistance.

In one aspect the present invention provides a product operable for use in manufacturing dielectric elastomer devices or layered structures of material, the product comprising a layer of material provided on a substrate wherein the layer and/or substrate are operable to allow the layer to be released from the substrate with a release treatment.

The release treatment may comprise using a solvent.
The release treatment may comprise peeling.
The release treatment may comprise using heat.

BRIEF DESCRIPTION OF THE DRAWINGS

Additional and further aspects of the present invention will be apparent to the reader from the following description of embodiments, given in by way of example only, with reference to the accompanying drawings in which.

Further aspects of the invention will become apparent from the following description of the invention which is given by way of example only of particular embodiments.

Best Modes For Carrying Out The Invention

Figure 1:
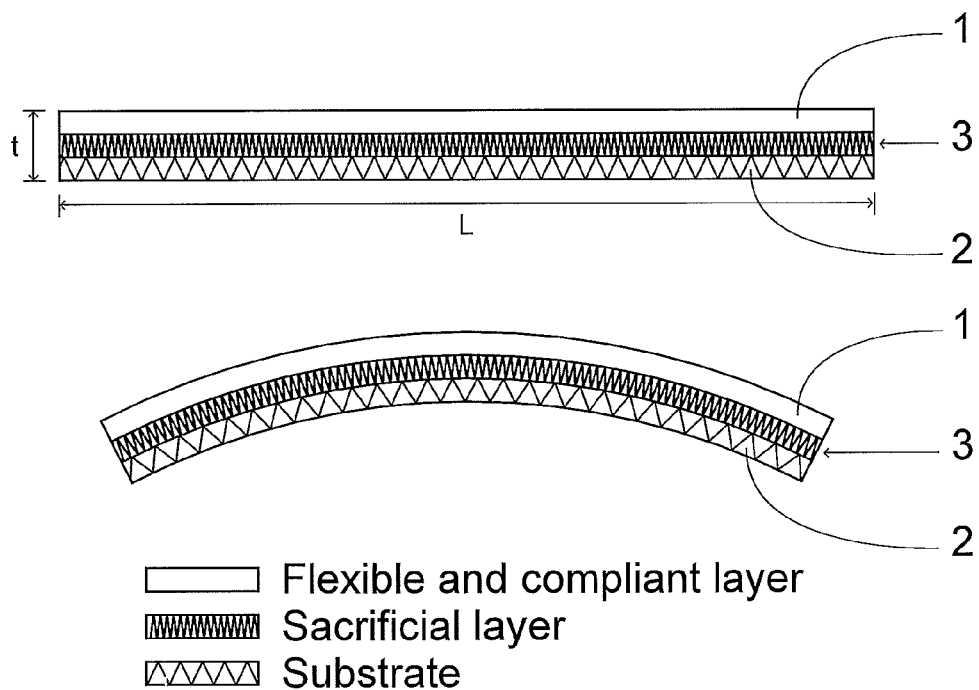
FIG. 1: shows a thin flexible and compliant layer releasably bonded to a flexible but non-compliant substrate with a sacrificial coating according to an embodiment of the present invention.

FIG. 1 schematically shows a layer of flexible and compliant material 1 affixed to a substrate 2. In this embodiment the layer is an elastomeric matrix material. In this particular embodiment the flexible and compliant layer 1 is bonded to the substrate 2 by a coating 3 on the substrate 2 and may be released from the substrate 2. The coating 3 in this embodiment is sacrificial and serves to bond the layer 1 to the substrate prior to release. The layer 1 is intended for bonding with other layers (not shown) to fabricate a laminate which forms part of a device which is deformable to provide a varying electrical characteristics which may be monitored to measure deformation such as strain.

The substrate 2 of this embodiment is flexible and able to bend but is non-compliant compared to the flexible and compliant layer 1. In this embodiment also the substrate and flexible and compliant layer are thin enough that the absolute strain in the layer 1 is insignificant, or within a defined error, relative to strain intended to be measured using the laminate. Also, the layer of material 1 to be used in the fabrication of the laminate is thin and affixed to the substrate 2 so distributed pressure applied to the exposed layer will not typically cause deformation.

The reader will understand that the substrate reinforces the flexible and compliant layer 1 and mitigates or prevents the layer warping, or experiencing non-uniform stresses or deformations during handling or processing. The flexible and compliant layer 1 can therefore remain in an un-strained or un-deformed state during handling and processing.

Figure 2:
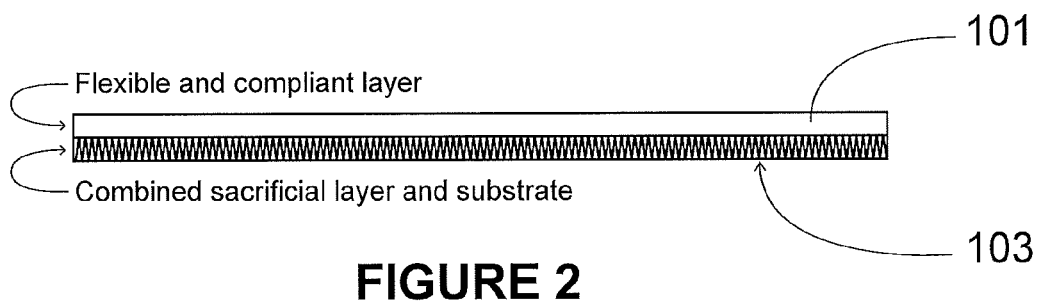
FIG. 2: shows a thin flexible and compliant layer releasably bonded to a self-supporting sacrificial layer according to an alternative embodiment of the present invention.

A product according to a further embodiment of the present invention is shown in FIG. 2. FIG. 2 shows a substrate 103 to which a layer 101 to be used in the fabrication of a laminate is affixed. The substrate is formed of a layer 103 which is can be sacrificed to release the layer 101. The sacrificial layer 103 is self-supporting with similar attributes to the substrate 2 of FIG. 1. In this embodiment the sacrificial layer 103 is thin, robust, and is flexible but non-compliant relative to the layer 101. In this embodiment the need for a substrate separate to the sacrificial layer is eliminated.

Figure 3:
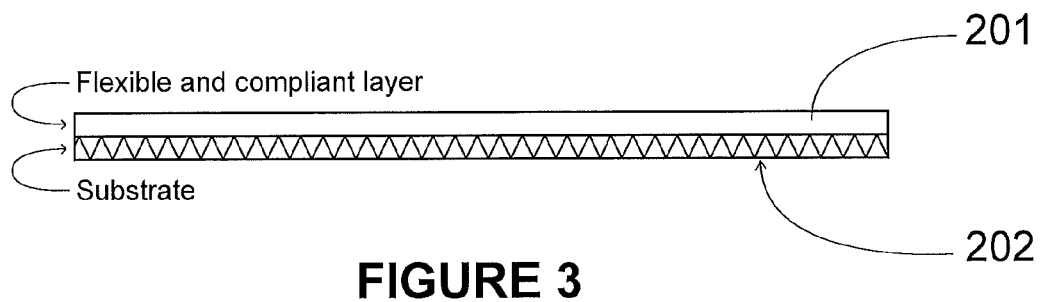
FIG. 3: shows a thin flexible and compliant layer releasably bonded to a flexible and compliant substrate according to a further embodiment of the present invention, where the flexible and compliant layer is able to be separated from the substrate by peeling.

FIG. 3 shows a product 200 according to a further embodiment of the present invention. In this embodiment a flexible and compliant layer of material 201 to be used to fabricate a laminate is affixed directly to a substrate 202. A sacrificial layer is not required in this embodiment as a bond strength between the flexible and compliant layer 201 and the substrate is sufficiently strong to prevent the flexible and compliant layer 201, or parts of it, from being strained significantly relative to the substrate 202 during handling and processing operations, but weak enough that the flexible and compliant layer can be released from the substrate 202 to cleanly separate them, such as by peeling for example.

As described below the stacked structures or laminates are illustrated using the product illustrated in FIG. 1 with three elements: substrate 2, sacrificial layer 3 and a flexible and compliant layer 1. However, the reader will be aware that alternative embodiments may use a two-element laminate as illustrated with reference to FIG. 2 or FIG. 3.

Figure 4:
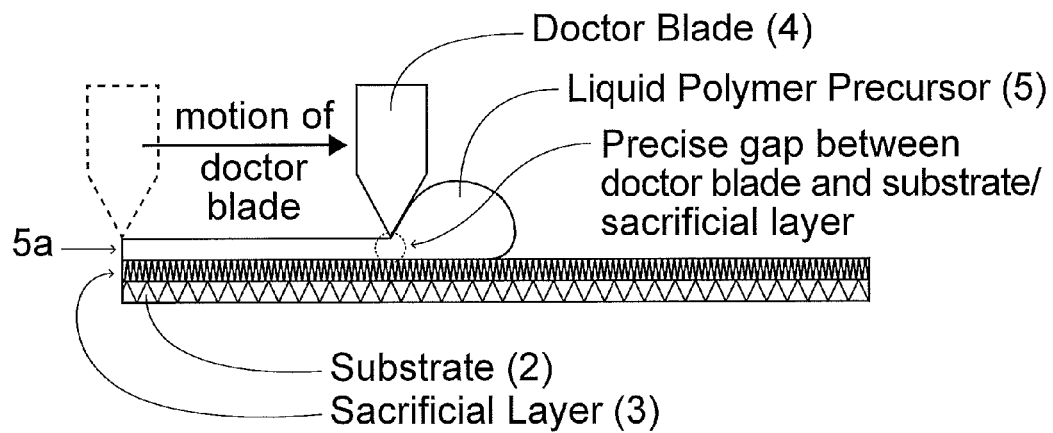
FIG. 4: shows a step in a method according to another embodiment of the present invention for forming a flexible and compliant layer from a precursor material using a doctor blade to create an evenly distributed thin film on a substrate.

FIG. 4 illustrates steps in a method according to an embodiment of the present invention in which a flexible and compliant layer 1 is formed on a substrate 2. The flexible and compliant layer (not shown) is formed from an elastomeric polymer material. A liquid precursor 5 of the polymer material is poured onto the sacrificial layer and spread into a thin film 5a using a doctor blade 4. The doctor blade 4 of this embodiment consists of a precision machined straight-edge or blade that is maintained at a uniform, exact height above the substrate 2 or sacrificial layer 3. By pouring a liquid onto the sacrificial layer and then dragging the doctor blade 4 across the substrate 2, the liquid is spread into a thin film with a uniform thickness. The liquid precursor 5 is then cured to form the flexible and compliant layer 1 bonded releasably to the sacrificial layer 3.

Figure 5:
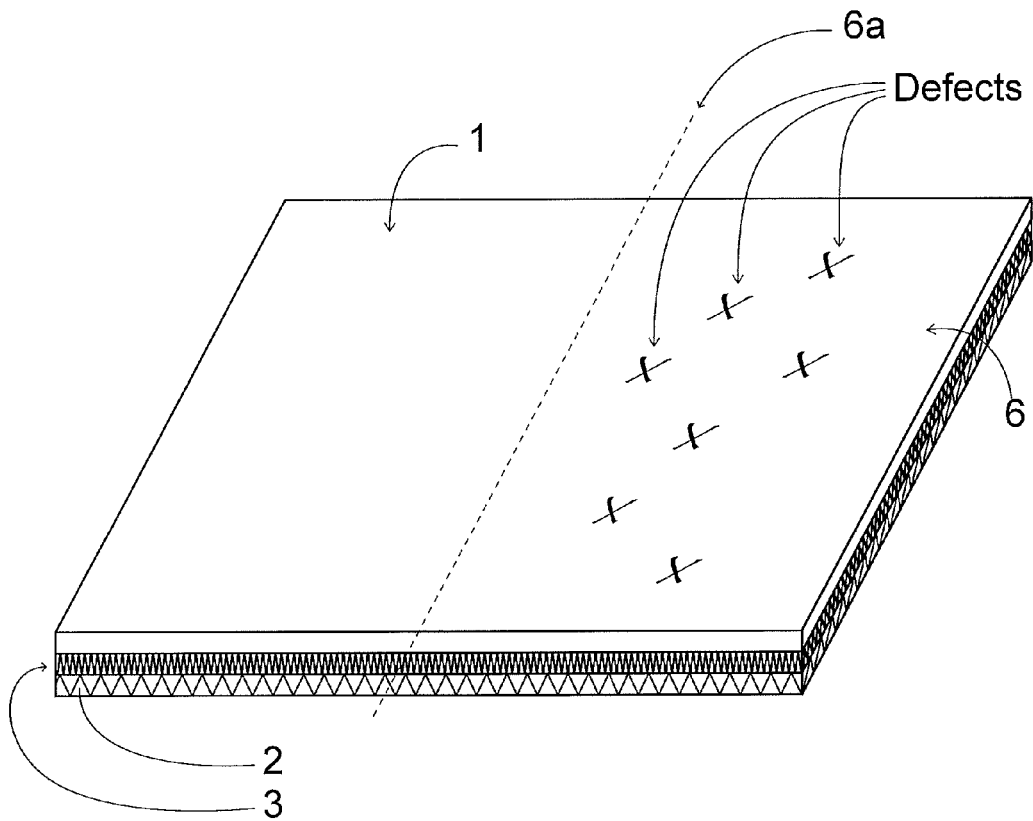
FIG. 5: shows a schematic representation of steps in a method according to a further embodiment of the present invention, the step including inspecting a flexible and compliant layer affixed to a substrate and removing any defective regions by cutting the region away.

FIG. 5 illustrates steps in a method according to an embodiment of the present invention in which the flexible and compliant layer 1 is examined. In this embodiment the layer is examined by capturing digital data for processing to characterise the surface to identify regions 6 that are defective or otherwise unusable for bonding to another layer to provide a laminate. In this embodiment characterisation determines regions 6 that are unsuitable specifically for sensing deformation by measuring electrical characteristics of the laminate. In this embodiment also, regions of the flexible and compliant layer 1 that are determined to be defective, of a substandard quality or otherwise un-usable are removed. In this specific embodiment further, any regions are cut away from the layer 1 at a cut line 6a with steps taken to avoid damaging other regions of the layer that are characterised as usable or characterized as non-defective.

Figure 6:
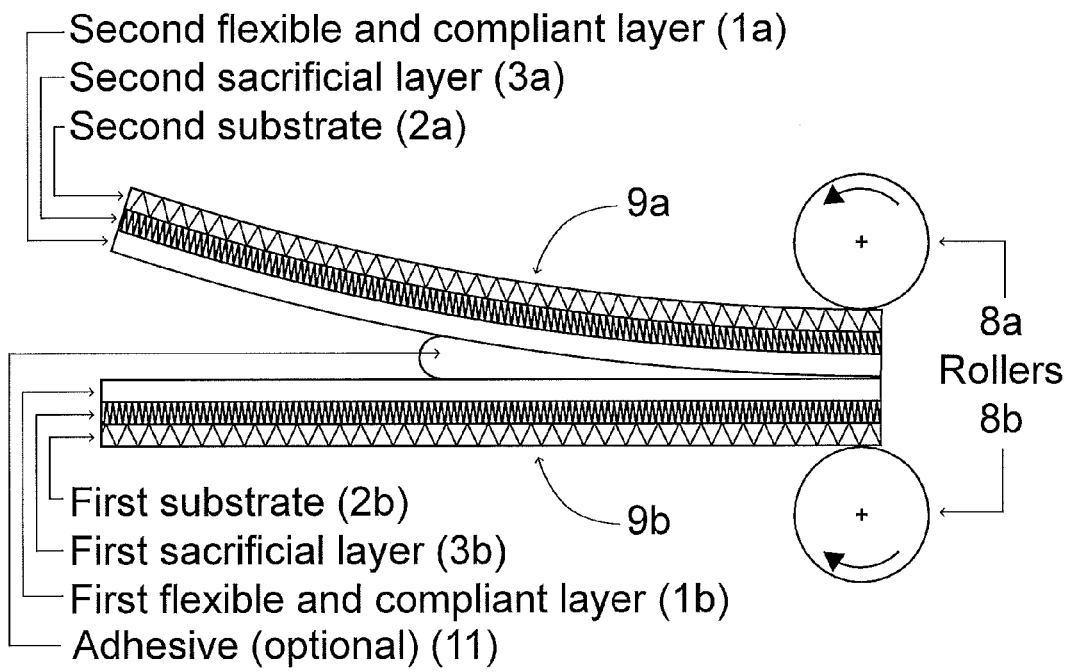
FIG. 6: illustrates a step in a method according to another embodiment of the present invention in which adhesive is applied between two flexible and compliant layers to be bonded together, each bonded to a flexible substrate, and passing them between a pair of rollers to squeeze out air bubbles and any excess adhesive to ensure a robust bond between the flexible and compliant layers.

FIG. 6 illustrates a step in a method of fabricating a laminate 7 according to a preferred embodiment of the present invention. In the step illustrated in FIG. 6 a rolling mechanism 8a and 8b applies force external to products 9a and 9b each having a substrate 2a or 2b, a sacrificial layer 3a or 3b and a flexible and compliant layer 1a or 1b. The rollers 8 bring the products together and press exposed layers 1a and 1b together so as to cause them to bond. In this specific embodiment an adhesive material 11 is provided between the two flexible and compliant layers 1a and 1b.

Figure 7:
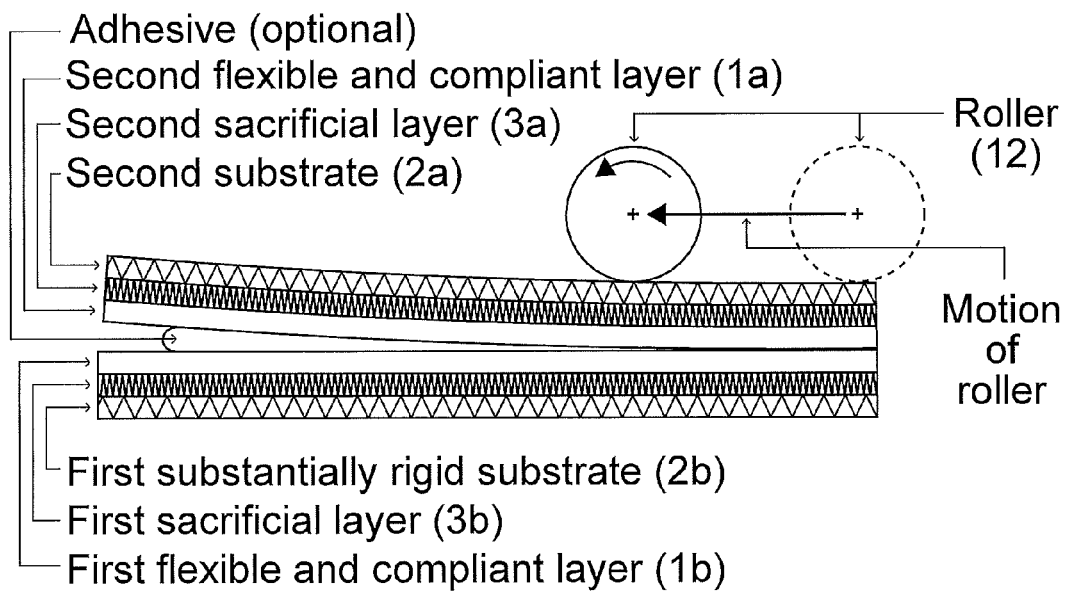
FIG. 7: illustrates a step in a method according to another embodiment of the present invention in which adhesive is applied between two flexible and compliant layers to be bonded together, where one is bonded to a substantially rigid substrate and the other is bonded to a flexible substrate, and applying pressure using a roller so as to force out excess adhesive and air bubbles from between the two flexible and compliant layers.

FIG. 7 illustrates a step in a method according to an alternative embodiment to FIG. 6. In this embodiment a rolling mechanism 12 presses one product 9a of a flexible and compliant layer 1a with a flexible substrate 2a affixed by a sacrificial layer 3a to a product of a flexible and compliant layer 1b affixed to a substrate 2b which is rigid in this case. The roller mechanism 12 of this embodiment acts only against the product with flexible substrate. In this specific embodiment the roller reciprocates against the substrate 2b. In this specific embodiment an adhesive material 11 is provided between the two flexible and compliant layers 1a and 1b.

Figure 8:
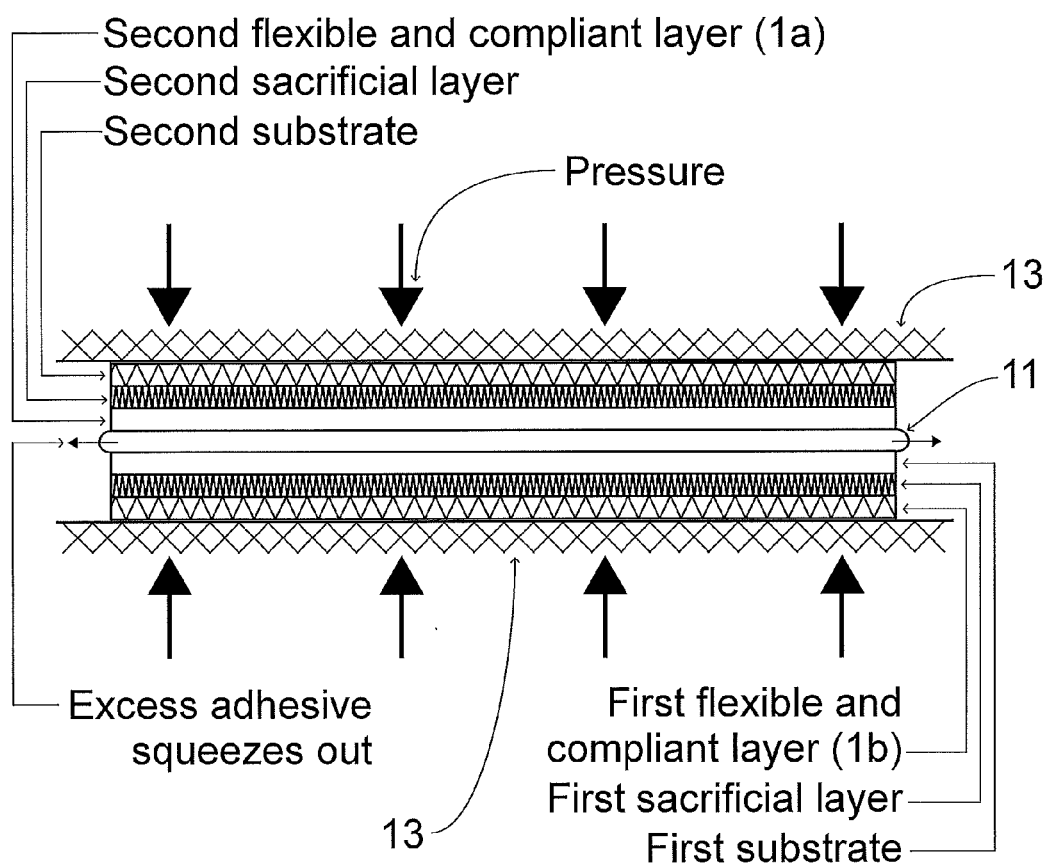
FIG. 8: illustrates a step in a method according to another embodiment of the present invention including applying a distributed pressure to squeeze two flexible and compliant layers together for bonding, and to squeeze excess adhesive from between the layers, or to hold the layers in place while the bond between the layers is forming.

FIG. 8 illustrates a step in a method according to an embodiment of the present invention. The step bonds two flexible and compliant layers 1a and 1b together using distributed pressure as an alternative to a roller or rollers.

In this specific embodiment an adhesive 11 is applied between the two layers 1 and 1b before they are brought together using a mechanical press, by placing a mass (not shown) on top of the laminate 7, or by placing the laminate in an airtight bag 13 and evacuating it, for example. Where the adhesive 11 is used, excess adhesive 11 is squeezed out from between the layers 1a and 1b as they are brought closer together. This aspect of the invention may be used in conjunction with the rolling process illustrated in FIG. 6 and FIG. 7. Namely, after the rolling step a distributed pressure is applied to the stack to prevent the layers from separating before the bonding process is complete and in this embodiment before the adhesive has set.

Figure 9:
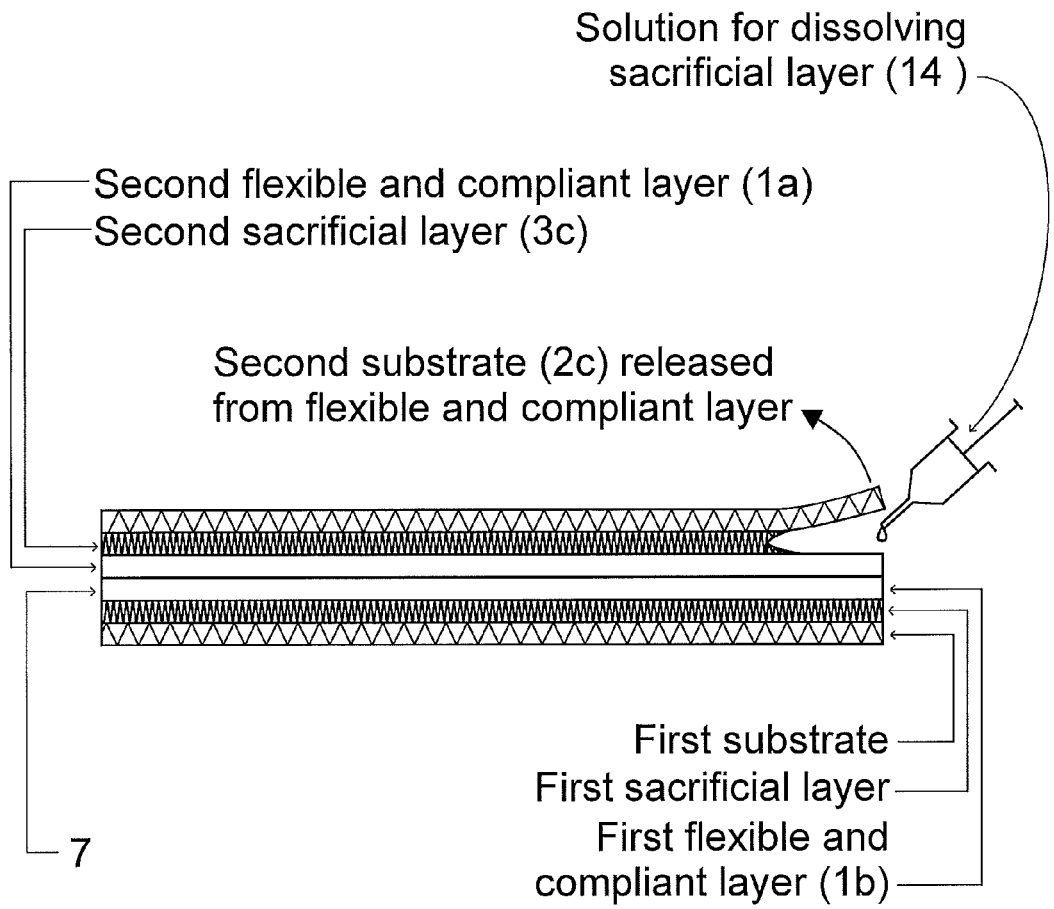
FIG. 9: illustrates a step in a method according to another embodiment of the present invention including dissolving the sacrificial layer between the flexible and compliant layer and the substrate to remove the substrate without subjecting the flexible and compliant layer to significant forces.

FIG. 9 illustrates schematically a step in a method according to an embodiment of the present invention. The step releases a flexible and compliant layer 1a from a respective substrate (not shown) and allows the substrate to be removed from the fabricated laminate 7 comprising two layers 1a and 1b. In this embodiment, the layer 1a is released and the substrate removed after the flexible and compliant layers 1a and 1b have bonded.

In the embodiment illustrated in FIG. 9 a releasing solution 14 is applied to one of the sacrificial layers 3c to dissolve it and release the layer 1 from the respective substrate 2.

Figure 10:
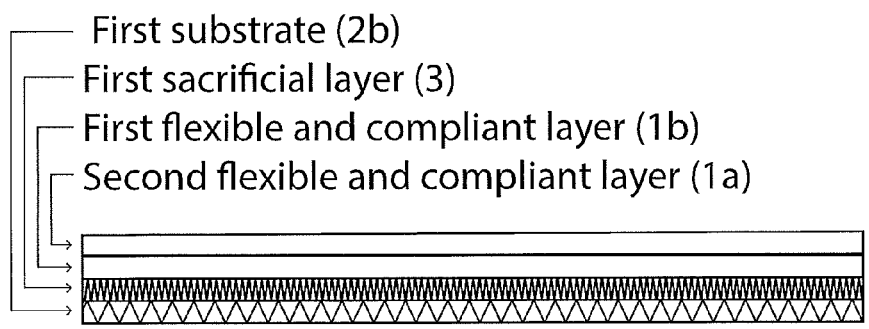
FIG. 10: illustrates a step in a method according to another embodiment of the present invention wherein a second flexible and compliant layer is bonded to a first flexible and compliant layer where a substrate has been removed and a respective flexible and compliant layer, via its bond to the first flexible and compliant layer, is being supported by the another substrate affixed to it's respective substrate.

FIG. 10 illustrates a product in the form of a laiminate 7 fabricated by flexible and compliant layer 1a having been bonded to another flexible and compliant layer 1b and the substrate (not shown) to which the layer 1b was affixed has been removed. Only one substrate 2b remains with the laminate 7 affixed. This laminate 7 can now be handled as if it were a single layer 1 temporarily bonded to the remaining substrate 2b.

If a total of only two layers 1a and 1b is required, the remaining substrate 3b is removed to form a bilayer laminate 7.

Figure 11:
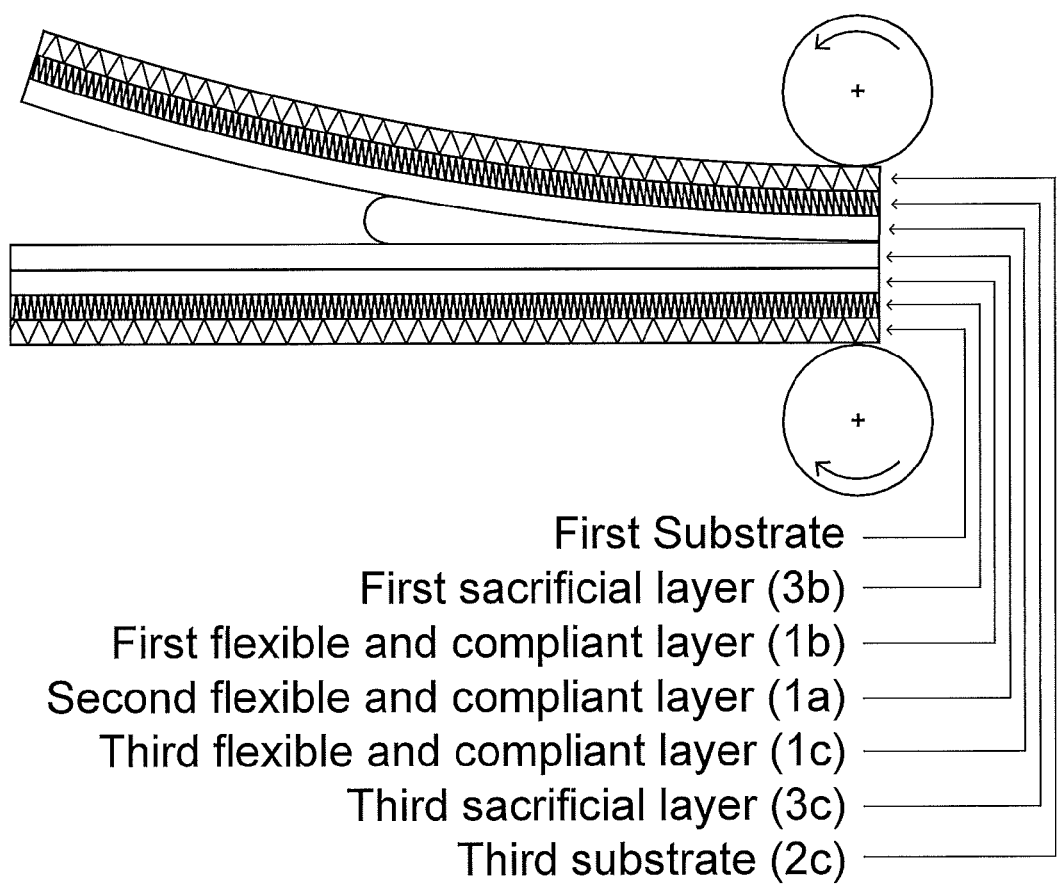
FIG. 11: illustrates a step in a method according to another embodiment of the present invention including repeating the process of bonding two layers together to bond a third layer on top of the stack formed by the first and second flexible and compliant layers.

Alternatively, as illustrated in FIG. 11, a third flexible and compliant layer 1c is bonded to the laminate 7. The third layer 1c is bonded to the flexible compliant layer 1a exposed by release from a substrate.

FIG. 11 further illustrates a step in a method according to an embodiment of the present invention. In this step a third flexible and compliant layer 1c is bonded to bonded layers 1a and 1b, forming a laminate, and a roller 8 is used to cause the layer is to bond to the laminate 7 similarly to the step illustrated with reference to FIG. 5. By this stage in the method a robust bond exists between the first two bonded layers 1a and 1c which are supported by a remaining substrate 2b during the bonding of a third flexible and compliant layer. The substrate to which the first bonded two layers 1a and 1b are affixed prevents any substantial deformation in the laminate 7 during subsequent handling or bonding operations required to bond the third layer 1c. Similarly, a third substrate 2c performs the same function for the third flexible and compliant layer. This process can be repeated for additional layers.

Figure 12:
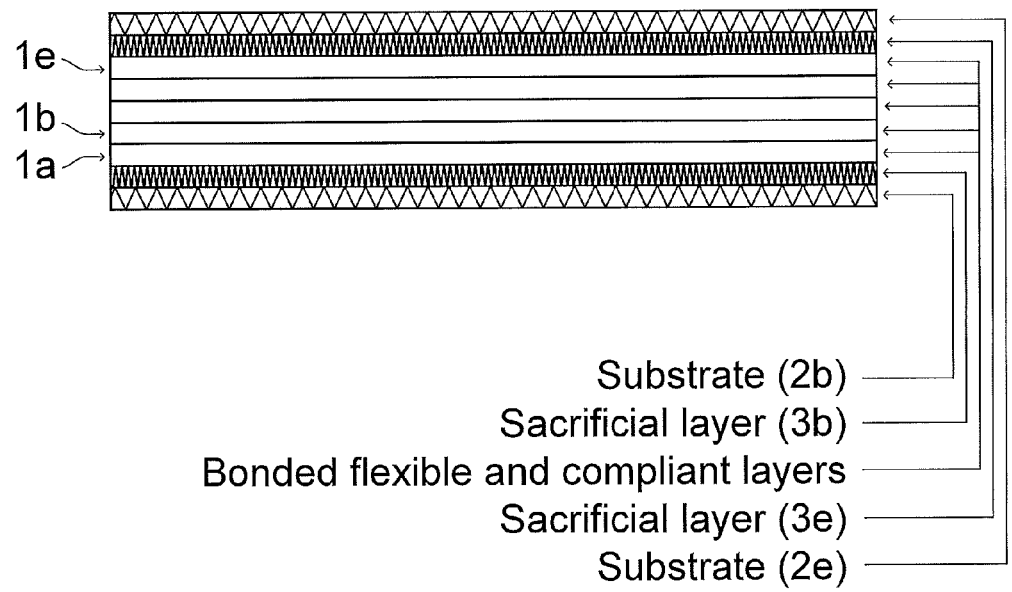
FIG. 12: illustrates a completed five layer laminate according to a further embodiment of the present invention, with the first and last substrates still attached to protect the stack during additional handling, processing, or storage.
Figure 13:
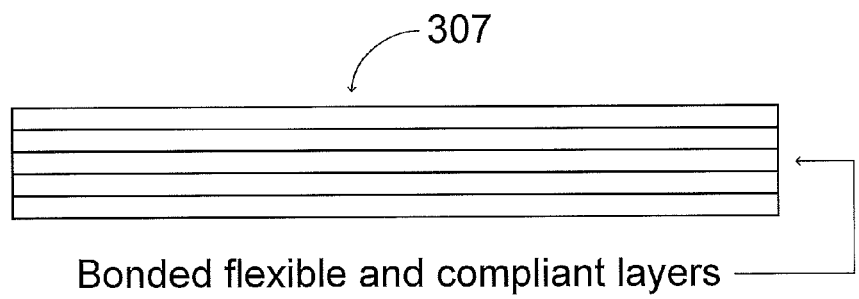
FIG. 13: shows a completed five layer laminate according to a further embodiment of the present invention the protective substrates removed.

FIG. 12 illustrates a laminate 307 having more than two layers 1 at the final stage of fabrication. In this embodiment five flexible and compliant layers 301a to 301e have been bonded together, and the first and last substrates 302b and 302e remain attached to the laminate 307. At this stage, the substrates could be left attached to the laminate 307 as a protective layer for moving or storing the laminate, or to make it easier to handle the laminate 307 for further fabrication operations, such as cutting the laminate 7 into a particular geometry for example. Alternatively the first and last substrate can be removed to form a freestanding multilayer flexible and compliant laminate as depicted in FIG. 13.

Figure 14A:
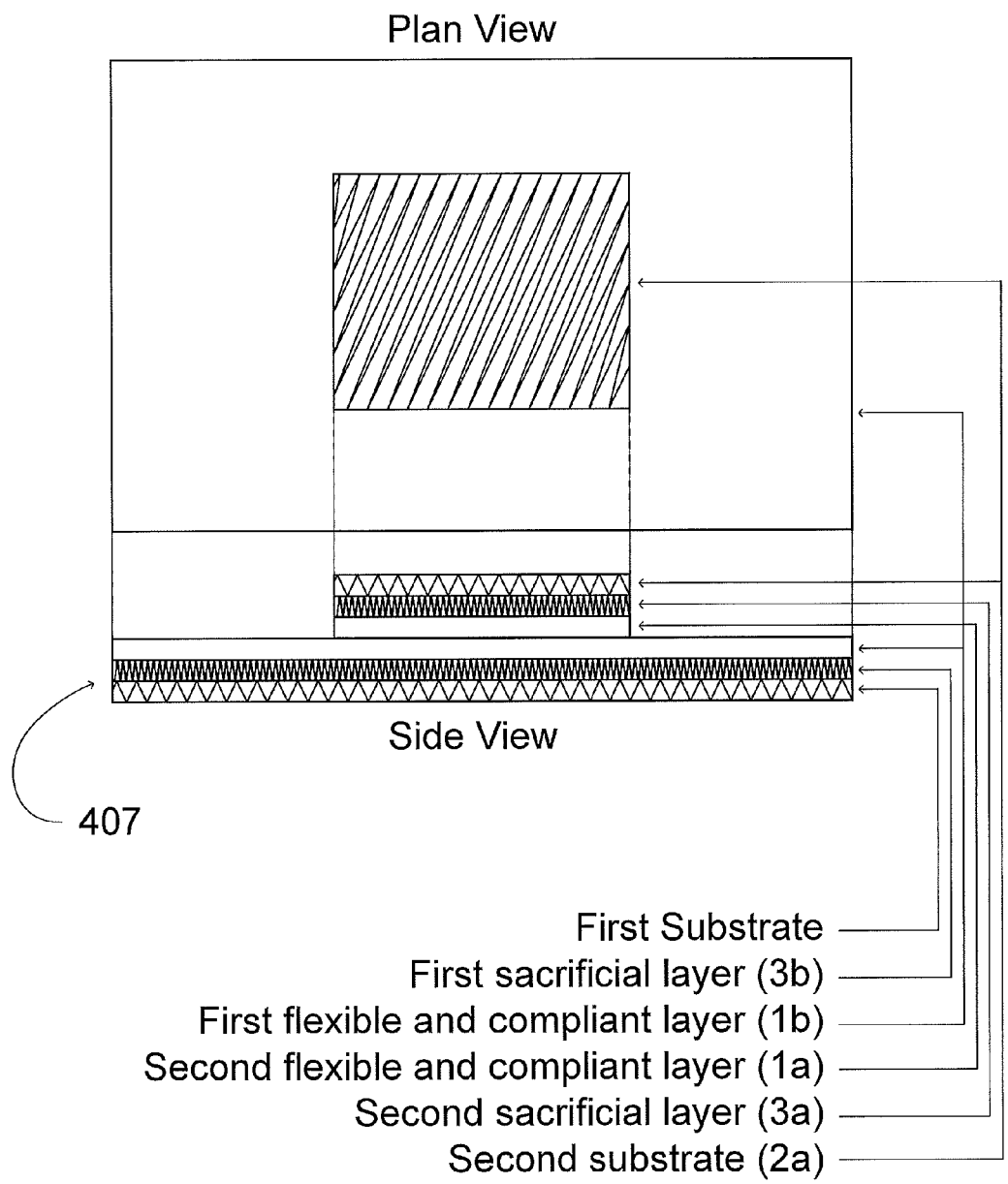
FIG. 14: illustrates a step in a method according to a present invention involving reshaping individual layers to custom geometries before bonding them to the laminate.
Figure 14B:
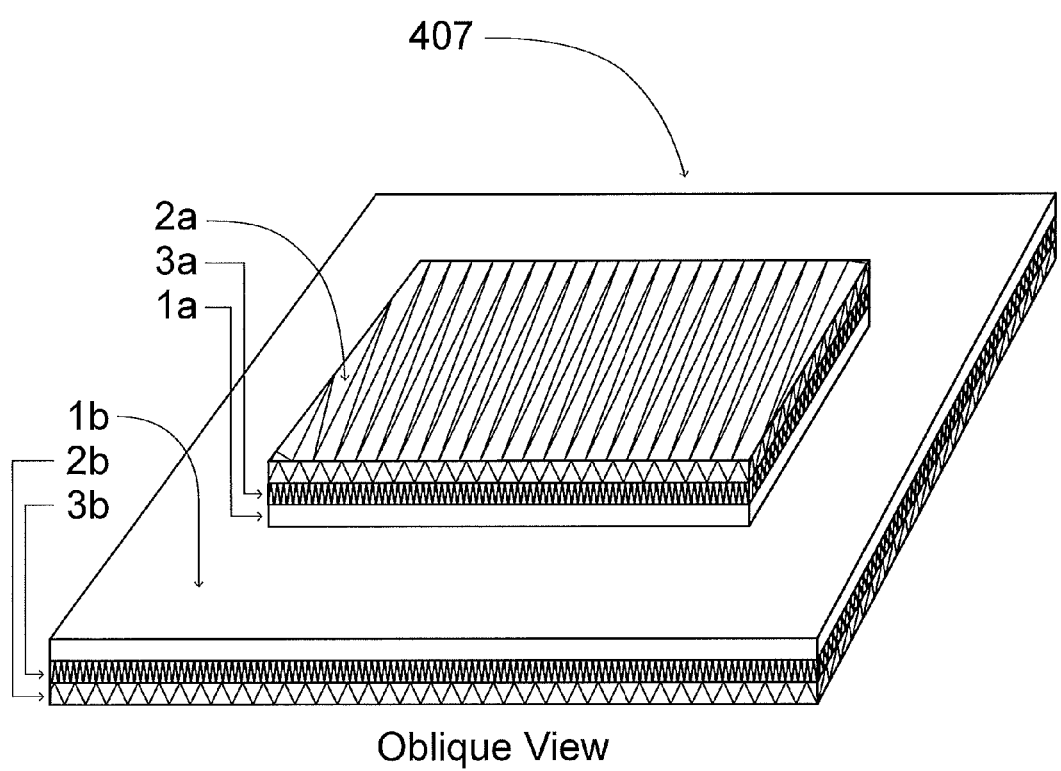

FIG. 14 illustrates step in a method according to a further embodiment of the present invention. In this step a layer is of a laminate 7 is reshaped prior to bonding to another layer 1b in a laminate. In this embodiment, a substrate protects the layer 1a from being deformed when it is cut to shape. The reshaped flexible and compliant layer 1a is then bonded to another layer 1b in a selected location on the layer. This approach makes it easier to manipulate individual layers 1. Namely, cured layers 1 are held in place by their substrate eliminating the need for a stencil or other contact based approach if a layer is was to be formed in place on the surface of a flexible and compliant layer 1b.

Figure 15A:
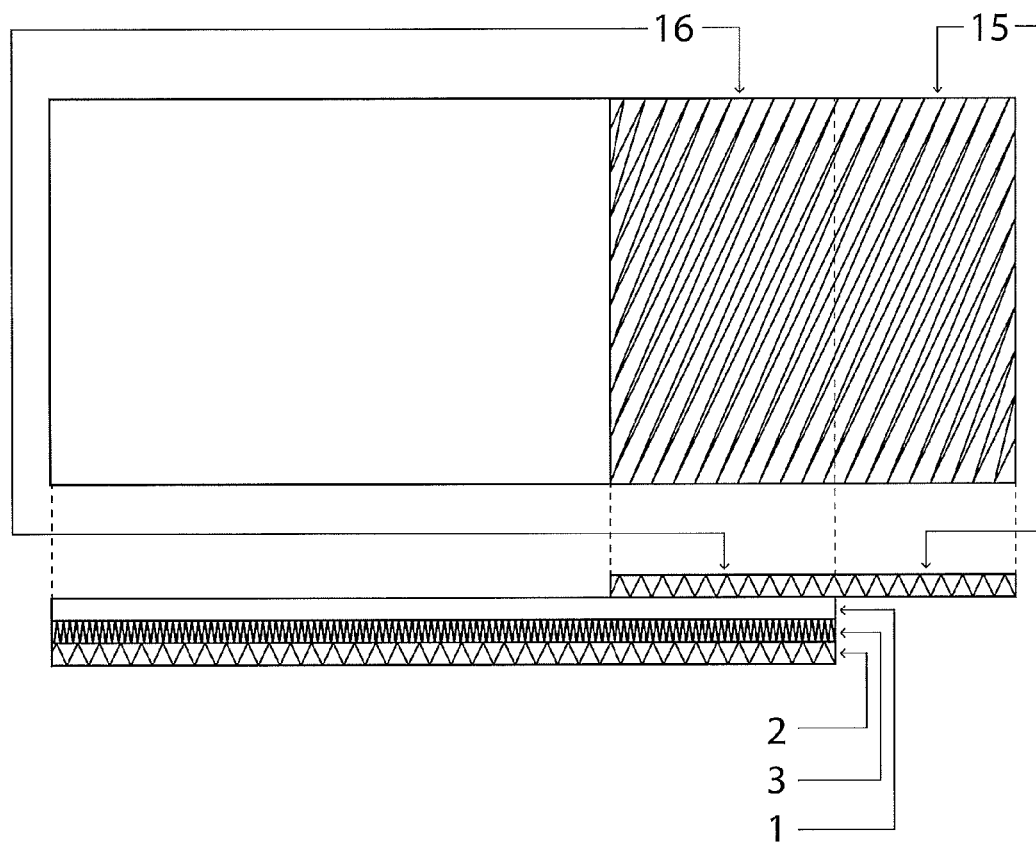
FIG. 15: illustrates a step in a method according to a present invention involving masking to selectively prevent regions of the flexible and compliant layers from bonding together.
Figure 15B:
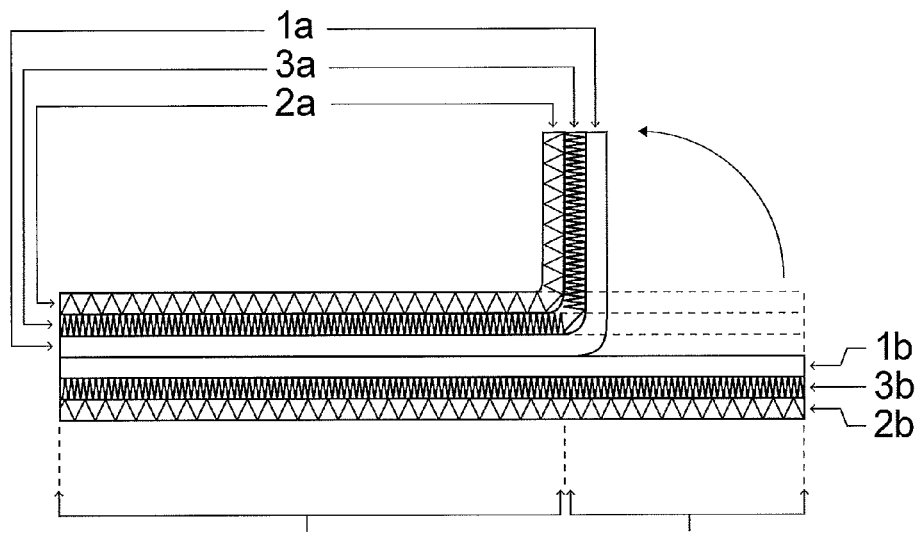
Figure 15B:
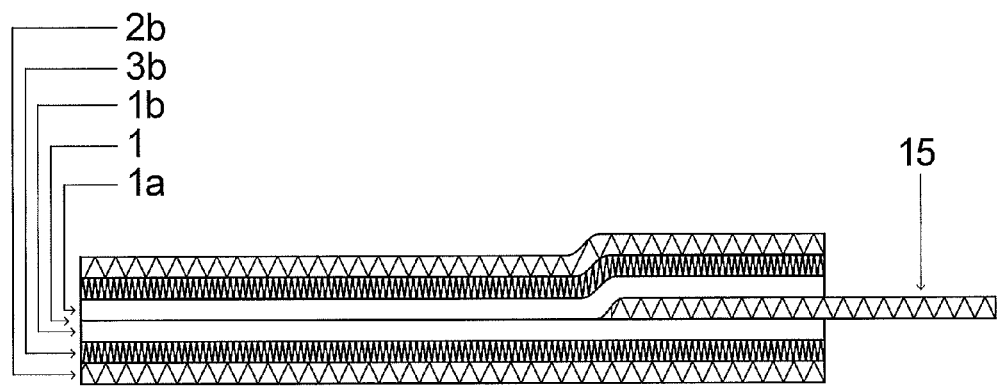

FIG. 15 illustrates a step in a method according to a further embodiment of the present invention. In this step masking 15 is applied to selectively prevent the flexible and compliant layers 1 from bonding together in defined masked regions 16. In this embodiment a mask is temporarily bonded to the surface of the first flexible and compliant layer 1 that prevents two flexible and compliant layers 1a and 1b from contacting. This prevents the formation of a direct bond between the flexible and compliant layers 1a and 1b. Additional layers can be bonded to the structure. However, the areas 16 that were masked can be readily and selectively separated. Where the mask is placed on the edge of the stack for example, the layers can be peeled apart up to the edge of the masked region. Separating the layers 1 in the masked region 16 enables the masking material to be removed from the laminate 7.

In various alternative embodiments the roller steps illustrated with reference to FIG. 6 or FIG. 7 may be adjusted suitably as known to the reader by varying the separation, speed or other known adjustments to roller presses.

In some embodiments the substrate supports the flexible and compliant layer and prevents it from being stretched or otherwise deformed during handling or processing.

Embodiments of the invention involve fabrication the layer of material on the substrate or sacrificial layer by molding, printing or screen printing.

In some embodiments fabrication of the first layer comprises processing a precursor material molding, printing or screen printing.

The embodiment of the invention illustrated with reference to FIG. 4 demonstrates one of several methods by which the flexible and compliant layer 1 can be bonded to the surface of a sacrificial layer 3. In alternative embodiments any method known to the reader to be suitable may be employed.

In some embodiments alternative methods known to the reader for forming a thin layer of precursor material 5 to that illustrated with reference to FIG. 5 can also be used to form the thin flexible and compliant layer 1. In example embodiments the liquid precursor 5 is sprayed onto the surface of the sacrificial layer 3 using an airbrush, drawn into a thin layer by spinning the substrate, printed onto the surface of the substrate using inkjet technology, molded it into a thin film using a compression or injection mold, or screen printed using a stencil.

In FIG. 5 both the second substrates 1a and 1b are flexible, while in FIG. 6 the substrate 1b is substantially rigid and the other substrate 1a is flexible. In both figures an adhesive 11 is applied between the layers 1, but alternative techniques that do not involve the addition of an adhesive such as plasma bonding or using the inherent surface properties of the first and second flexible and compliant layers are also possible in alternative embodiments of the present invention. Controlling the consistency of the adhesive 11, if used, and the pressure of the rollers 8 and 9 ensures the adhesive is evenly distributed at the desired thickness by squeezing out any excess adhesive from between the layers. The flexibility of one or both substrates is important in some embodiments for ensuring a rolling contact is made between two layers 1a and 1b. This prevents or minimizes the trapping of air bubbles between the two layers that would compromise the quality of the bond between the two layers.

In some embodiments a step similar to that illustrated with respect to FIG. 8 does not involve an adhesive 11 but, instead, uses alternative methods of bonding known to the reader.

In some embodiments the releasing solution 14 is a solvent.

In some embodiments, the substrate is porous and releasing solution is applied to a side opposite the flexible and compliant layer 1. The releasing solution soaks through the substrate to dissolve the sacrificial layer to release the flexible and compliant layer.

In some embodiments regions 16 of a layer of flexible and compliant material are masked in place of being removed.

Embodiments of the present invention provide a method of fabricating a laminate 7 of layers of material 1 with low contamination between the layers due to layers being formed separately prior to bonding to form the laminate.

Embodiments of the present invention provide a method of fabricating a laminate of thin layers 1 with mitigation of strain perpendicular to the through-thickness of layers of the laminate 7.

In the preceding description and the following claims the word "comprise" or equivalent variations thereof is used in an inclusive sense to specify the presence of the stated feature or features. This term does not preclude the presence or addition of further features in various embodiments.

It will be apparent to the reader that the substrate supports the layer affixed thereto.

In one embodiment the laminate 7 is intended for use in a dielectric elastomer sensor which has electrical characteristics that change as is known to the reader under deformation such as strain. The changes in electrical characteristics are large enough to be measured by electrical circuits to sense or measure deformation. In one application the deformation measured corresponds to movement of body parts of a mammal. Significant deformation or strain is determined relative to the scale of strain useful as a measurement made by the sensor. In one application, the measurement is on the scale of movement of digits or body parts of a mammal.

Embodiments of the present invention inspect layers of material 1 to be bonded to form a laminate 7 prior to such bonding. In some embodiments the data captured is photographic, video or digital data characterising strain thickness or other elastic, flexible or compliance related effects in the layer.

Embodiments of the present invention identify areas of the layer inspected that meet specifications for characteristics of layers suitable for use in fabricating laminations or laminated sensors. In some embodiments the specification defines strain in the layer or acceptable strain for laminated electrical sensors.

As the layer of material used for fabrication of a laminate is temporarily bonded and may be released. The reader will understand that the layer is releasably affixed to the substrate.

Embodiments of the invention provide advantages in allowing inspection of the layers prior to laminating.

In some embodiments geometries or shapes for areas of the layers of flexible and compliant or elastic material may be defined by geometry data.

In some embodiments of the present invention the material used as layers in the fabrication of a laminate is flexible.

In some embodiments of the present invention the material used as layers in the fabrication of a laminate is compliant and in some embodiments mechanically compliant.

In some embodiments of the present invention the material used as layers in the fabrication of a laminate is elastic.

In some embodiments of the present invention the material used as layers in the fabrication of a laminate is a combination of flexible and compliant.

In some embodiments of the present invention the material used as layers in the fabrication of a laminate is a combination of flexible, compliant and elastic.

In various embodiments various materials may be used for the layers used to form a laminate. Specific embodiments use elastomers, such as silicone or other materials known as suitable for dielectric elastomer devices such as sensors, actuators or generators.

In some embodiments carbon is embedded, impregnated or doped in a first layer but not a second layer formed separately and a deformable material such as silicone which is readily adaptable by the embedding, impregnating or doping is used. In these embodiments a laminate of these first and second layers has an electrically conductive layer distinct from a dielectric layer. Embodiments of the present invention provide such a device with thin layers.

In various embodiments of the present invention various techniques for bonding the layers used to fabricate the laminate are used. In some embodiments, these include applying adhesive, applying pressure, and pressing, rolling, curing or applying heating or radiation. In some embodiments these are applied in defined regions or patterns. In some embodiments these may be applied repeatedly. In some embodiments these may be applied for defined intervals.

Embodiments of the present invention allow reduced thickness of the layers with a clear juncture of electrically conductive to dielectric properties between the layers because the layers are fabricated separately without cross-contamination before bonding to form laminations. This allows layers of conductive material, such as silicone doped with carbon, and layers of dielectric material such as silicone to provide a sensor with electrical properties that vary sufficiently with deformation to allow sensing of small changes of deformation using electrical circuits.

Embodiments of the present invention involve selective release treatment to release one layer from a substrate to leave one or more other layers affixed or supported by a substrate. Embodiments may subsequently bond a third layer of material to fabricate a three or more layer laminate. In some embodiments the third layer of material is affixed or supported by a third substrate prior to being released after the third layer is bonded.

In some embodiments additional layers can be added to the layered structure if desired by repeating substantially the same process as described herein with respect to embodiments of the invention. A laminate is formed and one of the layers of material is released from it's respective substrate to expose it for bonding with another layer affixed, in this example, to another substrate. Meanwhile the laminate formed by the two layers of material is affixed by the unreleased layer of material to a substrate. In some embodiments this process is repeated by repeatedly releasing a layer to expose the layer for bonding with another layer which, in this embodiment, is affixed to a substrate. In some embodiments the layers of a fabricated alternate between materials of different dielectric constants or materials with as widely differing dielectric constants or electrical conductivity as possible to form a dielectric device, such as a dielectric elastomer sensor, generator or actuator.

In alternative embodiments the exposed layer is coated and the coating with another material is bonded to the coating. In further embodiments the coating comprises a precursor material which is treated prior to another layer of material being bonded. In further embodiments the precursor coating or the treated coating is inspected and masked or further treated prior to an additional layer being bonded. In these embodiments the invention provides an advantage of handling or the coating or the laminate with the substrate serving to allow handling while preventing or mitigating stress and strain or serving to facilitate inspection. This is similar to the advantage provided for a single layer by a respective substrate. The substrate may be specifically adapted for methods of scale in some embodiments.

In some embodiments the pressure may be repeated or sustained for one or more intervals suitable to allow a defined strength of bonding between the layers used to fabricate the laminate.

In some embodiments layers of flexible and/or compliant and/or elastic material may be used to form a stack of layers.

Embodiments of the present invention provide affixed layers of material bonded to a substrate.

Embodiments of the present invention provide affixed layers of material adhered to a substrate.

Embodiments of the present invention comprise applying pressure to bond layers of material for a period or set of intervals predicted to cause a given strength of bond.

In some embodiments a layer may be released from a substrate by peeling.

In some embodiments the substrate may be a section or sheet of flexible material. In some embodiments the substrate may be a sheet of material suitable for use with a roller manufacturing apparatus.

In some embodiments the substrate is section of material operable to support the layer of material used to fabricate a laminate so as to mitigate and or prevent stress or strain in the material during handling. In some embodiments the section is a sheet. In some embodiments the section is a coating of material. In some embodiments the section may be operable to handle the material during roller press treatment.

Embodiments of the present invention may involve pressing the first and second layers together under pressure which is external to the layers. In some embodiments the applied pressure is external to the substrates on which the first and second layers of material used to fabricate the laminate are affixed or formed. Various embodiments use various known apparatus for applying pressure, including single rollers, pairs of rollers, mechanical presses, vacuum bags pressure chambers and other apparatus know to the reader to be suitable. In some embodiments the pressure is applied after the layers of the material used to fabricate the laminate are released from the respective substrates. In some embodiments, combinations of apparatus are used to apply pressure.

Laminating multiple layers according to embodiments of the present invention also has the advantage of improving the structural integrity of a sensing element. Having multiple layers reduces the probability that a defect in one layer will align with a defect in an adjacent layer, thus reducing the probability that a defect extends through the entire thickness of the device. An individual defect therefore has less influence on the overall structure.

Embodiments of the present invention provide specific advantages in producing flexible, compliant and lightweight sensing devices from stacks of delicate thin films, such as a dielectric elastomer device for example.

Embodiments of the present invention specifically provide advantages in respect of two fabrication issues. These are dealing with the handling of delicate and often fragile constituent layers and creating a robust connection between adjacent layers.

Embodiments of the present invention facilitate fabrication of laminates with reduced thickness of the individual flexible and compliant layers. This can reduce weight and overall stiffness and is highly advantageous where unobtrusiveness is a critical design criterion. As layers become thinner the membranes themselves often become increasingly fragile and susceptible to deformation, and it becomes more difficult to handle and manipulate them without deforming and/or damaging them. Embodiments of the present invention mitigate any deformation in the membrane being "locked in" to the stacked structure during the bonding process. Therefore, embodiments can avoid irregular stress/strain fields within the device that will cause its final rest state to be warped or deformed. Embodiments of the present invention facilitate robust bonds formed between adjacent layers, to mitigate defects such as particulates, air bubbles, or areas of weak bonding, for example. These may compromise the structural integrity of the device by creating a stress riser, a region of inhomogeneous strain, or promoting separation of the layers.

One solution to this problem in accordance with embodiments of the present invention is to form an initial thin layer on a temporary substrate, then sequentially form subsequent layers in-place on top of the previous layer. For example, where the layers are constructed from soft polymer such as silicone, the liquid precursor is transferred to the surface of the previous layer and cured in-place to form the next layer. The liquid could be deposited using processes such as spraying, spin coating, or doctor blading, for example. This has the added benefit that often as the new layer cures it will simultaneously bond to the previous layer, ensuring a robust connection between the two layers. The primary challenge with such a process becomes controlling the excess liquid precursor, i.e., preventing it from coating areas that it is not meant to coat. The added complexity of precise printing techniques, such as those based on inkjet technology, or masking processes can alleviate this issue, however there is still no opportunity to inspect the finished new layer prior to it being bonded to the previous layer. In some embodiments of the present invention the time of curing the precursor and/or the time of applied pressure can be controlled, adjusted or selected to trade characteristics of the laminate, such as acceptable levels of contamination of dispersants from one layer to another and/or bond strength and/or thickness of layers.

Embodiments of the present invention comprise a sensor comprising a dielectric elastomer laminate fabricated described and illustrated herein with respect to any of the drawings, connected to an electronic circuit operable to monitor changes on one or more electrical characteristics of the device and one or more processors operable to measure the effects of deformation of the device using an output of the electrical circuit. Specific embodiments may comprise this sensor anchored to a body or item of apparel for bodies to monitor movement or deformation of the body or bodies or deformation or movement in the apparel.

A dielectric elastomer device according to or manufactured according to embodiments of the present invention will now be described. The dielectric elastomer device has a structure which consists of three layers of compliant or elastic material, such as an elastomer. Silicone is used as the elastomer in some embodiments, though the reader will be aware of various suitable alternatives. A simple, example of a device has three layers. In this embodiment an inner layer is dielectric and non-conducting. Two outer layers are electrically conducting. In this embodiment the conducting layers are an elastomer comprising a dispersion of conducting particles such as graphite. The two outer layers provide electrodes which may typically have a relatively high electrical resistance, as is well known to the reader for dielectric elastomer devices. Elastomers are compliant, flexible and elastic. They are also often resilient. Under strain the conductive layers may change in resistance. Also under strain a capacitance formed by the two electrodes and the dielectric layer which separates them will vary. The change in resistance and/or the change in capacitance of a dielectric elastomer device is suitable for sensing by electrical circuits and/or processors but known to the reader, to sense deformation of the dielectric elastomer device.

The capacitance is dependent on the thickness of dielectric layer separating the electrodes and on the overlapping area of the electrodes. When the device is deformed during operation, the capacitance and/or the resistance of the electrodes will thus change along with geometry of the sensor 1. The state of strain of the device before operational deformations are applied. Embodiments of the present invention provide devices, or methods of manufacturing devices or components of devices, which allow reduced manufactured thickness of layers to enhance capacitive properties of devices. Embodiments of the present invention provide devices, or methods of manufacturing devices or components of devices, which allow characterisation of regions of layers before being bonded into a device and allow masking or removal of regions characterised as defective.

Embodiments of the present invention allow reduced thickness of the layers of a sensor comprising electrically conductive layers that exhibit electrical characteristics that vary with stress, strain, compliance or deformation without stress, strain, flex, compliance or deformation introduced in the fabrication process because the layers used to fabricate the laminate are handled, bonded or processes while affixed to a substrate that mitigates these effects.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claimed is:

1. A method of manufacturing a laminated sensor device comprising two or more electrode films of elastomeric material having a dispersion of conductive particles to provide compliant conductive electrodes and comprising one or more dielectric film(s) of elastomeric material separating the conductive electrodes to provide a compliant dielectric for a capacitor formed by the electrode films wherein the capacitance of the capacitor varies with deformation of the films to allow the laminated device to sense strain, the method comprising the steps of:
   providing a first film on a non-compliant substrate;
   bonding to the first film a second film while the first film is releasably bonded to a substrate to mitigate strain occurring in the first film during bonding, wherein the first film is formed distinctly to the second film; and
   releasing the first film from the substrate to provide lamination of first and second films.

2. The method of claim 1, wherein the step of bonding to the first film the second film comprises pressing the first film between the substrate and the second film.

3. The method of claim 1, wherein the substrate is flexible.

4. The method of claim 1, wherein the first film may be affixed to the substrate such that strain perpendicular to the through-thickness of the film is not imparted to the first film during handling bonding and/or processing.

5. The method of claim 1, wherein the substrate comprises a sacrificial layer to which the first film is affixed and which releases the first film when a release treatment is applied.

6. The method of claim 1, wherein the first film is deposited on the substrate.

7. The method of claim 1, comprising characterising any defective areas of the first film as defective using a specification for characteristics of film suitable for use in a sensor prior to bonding to the second film.

8. The method of claim 1, wherein the method comprises bonding a third film to bonded first or second films to form a laminate of three or more films.

9. The method of claim 1, comprising cutting one or more of the first or second films while affixed to one or more of the first or second substrates into one or more areas to be used in the fabrication of a laminate wherein the areas used meet a specification for usability.

10. The method of claim 1, comprising applying external pressure to press the first and second film together.

11. The method of claim 1, wherein prior to the step of bonding the second film to the first film the second film is bonded to additional films formed in a sequence of layers of film.

12. The method of claim 11, wherein one or more of the first, second and additional films are formed by screen printing.

13. The method of claim 1, further comprising a step of masking one or more regions of the first or second films.

14. The method of claim 1, wherein the two or more electrode films and one or more dielectric film provided are adapted such that the laminated device is suitable for sensing strain on the scale of movement of digits or body parts of a mammal.

15. The method of claim 1, wherein the method comprises capturing digital data for the first film to detect defects in the film and masking defects prior to bonding of the second film.

16. The method of claim 15, wherein the digital data is captured and defective areas identified prior to bonding the second film and wherein the method comprises the step of bonding the one or more masks to respective one or more defective regions identified.

17. The method of claim 1, wherein the method comprises capturing digital data for the first film to detect defects in the film and treating defects prior to bonding of the second film.

18. The method of claim 1, wherein the method comprises bonding one or more masks to the first film to prevent the second film bonding in one or more defined mask regions.

19. The method of claim 1, wherein the first film is fabricated by forming a layer of precursor material on the substrate and treating the precursor material to form the material of the first film.

20. The method of claim 1, comprising capturing digital data on the first film or second film and applying adhesive to regions identified as non-defective.

21. The method of claim 10, wherein applying pressure to the first and second films comprises passing the films affixed to the substrates under one or more rollers or between two or more rollers.

22. The method of claim 21, wherein applying external pressure comprises using a vacuum bag in which is evacuated while containing the first and second films.

* * * * *